United States Patent
Park

(10) Patent No.: US 9,829,101 B2
(45) Date of Patent: Nov. 28, 2017

(54) GEAR SHIFTING CONTROL METHOD FOR ELECTRIC VEHICLE

(71) Applicant: Hyundai Motor Company, Seoul (KR)

(72) Inventor: Jong Yun Park, Hwaseong-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/930,238

(22) Filed: Nov. 2, 2015

(65) Prior Publication Data
US 2016/0341264 A1   Nov. 24, 2016

(30) Foreign Application Priority Data

May 20, 2015 (KR) .................. 10-2015-0070259

(51) Int. Cl.
| | |
|---|---|
| *F16D 48/06* | (2006.01) |
| *F16D 13/66* | (2006.01) |
| *F16H 61/684* | (2006.01) |
| *F16D 23/04* | (2006.01) |
| *F16D 23/06* | (2006.01) |

(52) U.S. Cl.
CPC .......... *F16H 61/684* (2013.01); *F16D 23/04* (2013.01); *F16D 13/66* (2013.01); *F16D 2023/0687* (2013.01)

(58) Field of Classification Search
CPC ............. F16H 61/684; F16D 23/04; F16D 2023/0687; F16D 13/66
See application file for complete search history.

(56) References Cited

U.S. PATENT DOCUMENTS

| | | |
|---|---|---|
| 2003/0054920 A1 | 3/2003 | Berger et al. |
| 2007/0102206 A1* | 5/2007 | Lee ............ B60K 6/445 180/65.25 |

FOREIGN PATENT DOCUMENTS

| | | |
|---|---|---|
| EP | 2532546 A1 | 12/2012 |
| JP | 11-170877 A | 6/1999 |
| JP | 2003522670 A | 7/2003 |
| JP | 2009286203 A | 12/2009 |
| KR | 10-1282691 B1 | 7/2013 |

OTHER PUBLICATIONS

Korean Office Action issued in Korean Patent Application No. 10-2015-0070259, dated Aug. 11, 2017.

* cited by examiner

*Primary Examiner* — Redhwan k Mawari
*Assistant Examiner* — Rodney P King
(74) *Attorney, Agent, or Firm* — McDermott Will & Emery LLP

(57) ABSTRACT

A gear shifting control method for an electric vehicle includes an operation range determination step of determining, by a controller, whether a current revolutions per minute (RPM) of a motor falls within a constant torque range or a constant power range when gear shifting is initiated between a first shift gear and a second shift gear. A variable control step controls an operating power of a cone clutch by adjusting an operating tilt if it is determined that the RPM of the motor falls within the constant torque range in the operation range determination step. A constant control step controls the operating power of the cone clutch to be constant if it is determined that the RPM of the motor falls within the constant power range in the operation range determination step.

5 Claims, 4 Drawing Sheets

GEAR SHIFTING CONTROL METHOD FOR ELECTRIC VEHICLE

CROSS REFERENCE TO RELATED APPLICATION

The present application claims priority to Korean Patent Application No. 10-2015-0070259, filed May 20, 2015, the entire content of which is incorporated herein for all purposes by this reference.

TECHNICAL FIELD

The present disclosure generally relates to a gear shifting control method for an electric vehicle, and more particularly, to a gear shifting control method for a transmission of an electric vehicle having a cone clutch.

BACKGROUND

FIG. 1 shows a general gearshift of an electric car to which the present disclosure can be applied, in which a motor M is connected to an input shaft IN for supplying power and an output shaft OUT is parallel to the input shaft IN. A first driving gear 1D and a first driven gear 1P are installed on the input shaft IN and output shaft OUT and are interlocked. A second driving gear 2D and a second driven gear 2P are also installed on the input shaft and the output shaft and interlocked.

A synchronizer is mounted to the output shaft OUT between the first and second driven gears 1P and 2P to connect or disconnect the first and second driven gears 1P and 2P to or from the output shaft OUT. A cone clutch CC is arranged between the second driven gear 2P and the output shaft OUT to enable power transmission by friction.

The motor M, the synchronizer, and the cone clutch CC are controlled by a controller C.

Alternatively, the synchronizer and the cone clutch CC may be installed on the input shaft IN to form a gearshift, and the present disclosure is also available to the gearshift.

As such, the gearshift may use the cone clutch CC in gear shifting to prevent torque interruption, which blocks torque from being transmitted to the output shaft OUT from the input shaft IN while shifting gears. In this case, shift quality depends on how the cone clutch CC is controlled, so that a need exists to control the cone clutch CC to maximize the shift quality.

For example, when gear shifting is made from a first gear to a second gear, the synchronizer changes the first driven gear 1P into a neutral condition from a connection state to the output shaft OUT and then changes the second driven gear 2P into the connection state to the output shaft OUT, and in between, drives the cone clutch to constantly transmit torque to the output shaft OUT from the input shaft IN using frictional force. In this case, the torque at the output shaft OUT needs to change from state A' into state B' as the first gear is shifted to the second gear as shown in FIG. 2, and during this change, it is beneficial for securing the shift quality when the torque changes linearly as shown in FIG. 2.

The above information is presented as background information only to assist with an understanding of the present disclosure. No determination has been made, and no assertion is made, as to whether any of the above might be applicable as prior art with regard to the present disclosure.

SUMMARY

The present disclosure has been made keeping in mind the above problems occurring in the prior art. An aspect of the present inventive concept provides a gear shifting control method for electric vehicles with a gearshift having a cone clutch to improve shift quality by controlling the cone clutch such that an output torque at an output shaft changes linearly during gear shifting.

A gear shifting control method for an electric vehicle includes an operation range determination step of determining, by a controller, whether a current revolution per minute (RPM) of a motor falls within a constant torque range or a constant power range when gear shifting is initiated between a first shift gear and a second shift gear. A variable control step controls, by the controller, an operating power of a cone clutch by adjusting an operating tilt if it is determined that the RPM of the motor falls within the constant torque range in the operation range determination step. A constant control step controls, by the controller, the operating power of the cone clutch to be constant if it is determined that the RPM of the motor falls within the constant power range in the operation range determination step.

The controller may perform the variable control step when the RPM of the motor enters the constant torque range during the constant control step.

The variable control step and the constant control step may be performed until a synchronizer is interlocked with the second shift gear. The cone clutch may be released after the synchronizer is interlocked with the second shift gear.

The operating tilt in the variable control step may be obtained by dividing a difference between a torque at a current output shaft when the variable control step is initiated and a torque at a target output shaft when the variable control step is terminated by the target time which is required for performing the variable control step.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Figure 1:
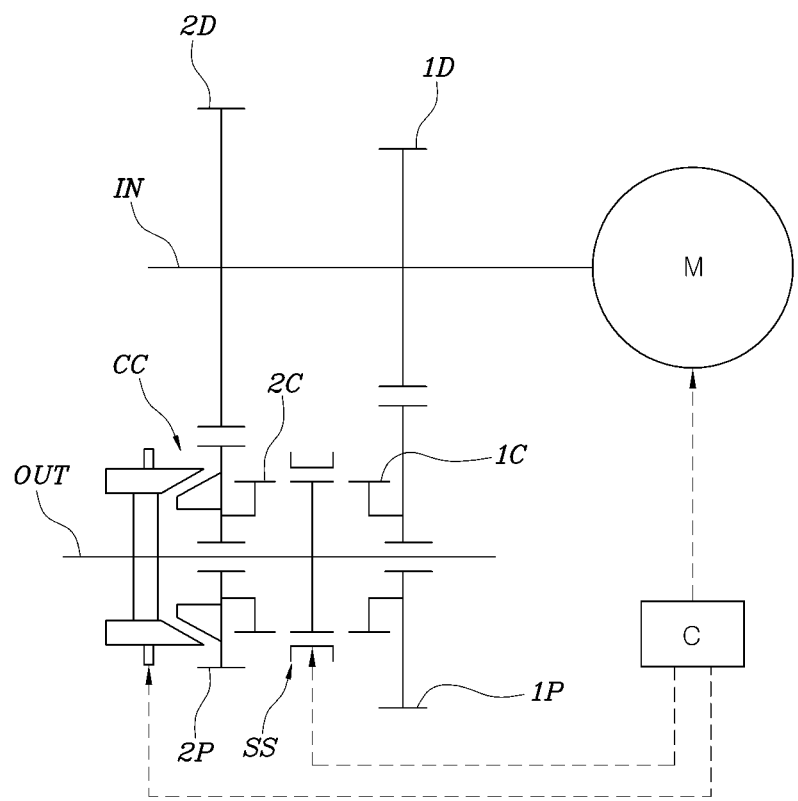
FIG. 1 is a diagram of an exemplary configuration of a 2-speed gearshift for an electric vehicle having a cone clutch according to the related art to which the present disclosure is applicable.

Hereinafter, embodiments of the present inventive concept will be described in detail with reference to the attached drawings.

Reference now should be made to the drawings, in which the same reference numerals are used throughout the different drawings to designate the same or similar components.

Figure 3:
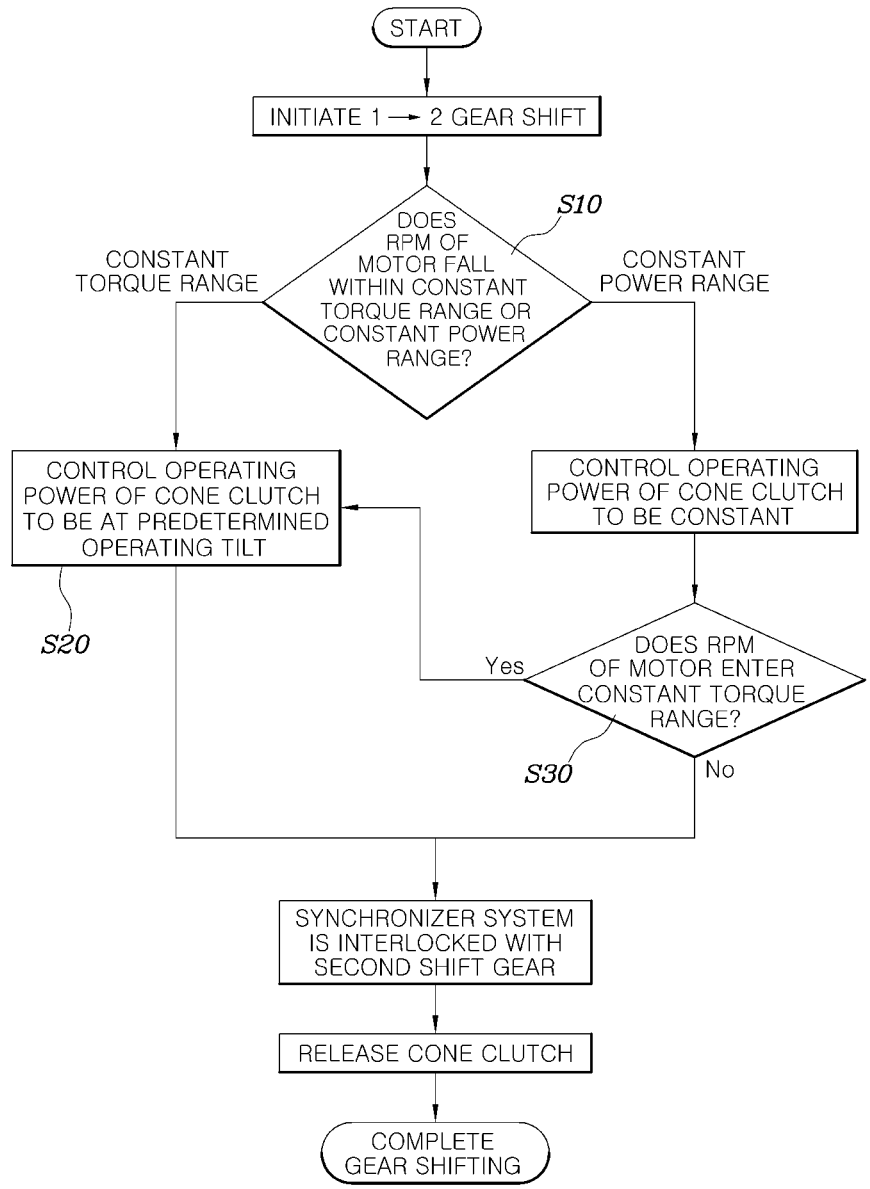
FIG. 3 is a flowchart illustrating a gear shifting control method for an electric vehicle according to an embodiment of the present inventive concept.

Referring to FIG. 3, a gear shifting control method for an electric vehicle according to an embodiment of the present inventive concept, a controller C determines whether revolutions per minute (RPM) of a motor M falls within a constant torque range or a constant power range when gear shifting is initiated between a first shift gear and a second shift gear at step S10 (an operation range determination step). An operating power of a cone clutch CC is controlled by adjusting a predetermined operating tilt if it is determined that the RPM of the motor M falls within the constant torque range at step S20 (variable control step). The operating power of the cone clutch CC is maintained if it is determined that the RPM of the motor M falls within the constant power range at step S30 (constant control step).

That is, if the controller C determines that gear shifting from the first gear in a driving state to the second gear is required, the controller C determines whether the current RPM of the motor M falls within the constant torque range or the constant power range and performs the variable control step or the constant control step based on the determination result.

Furthermore, while performing the constant control step S30, the controller C changes to the variable control step S20 when the RPM of the motor enters the constant torque range.

Figure 4:
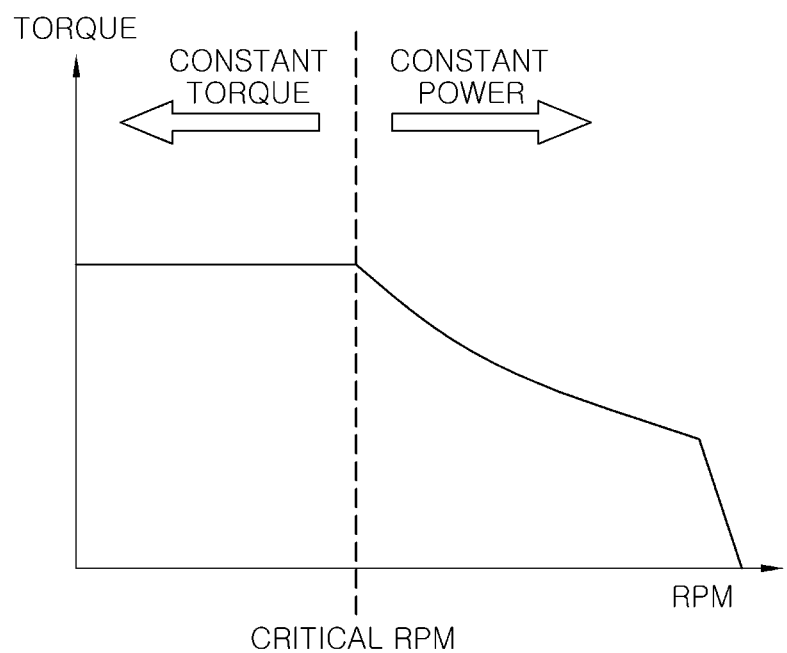
FIG. 4 is a characteristic curve of change in torque over revolutions per minute (RPM) of a motor.

FIG. 4 is a graph showing a characteristic curve of change in torque over RPM of a motor, in which torque characteristics are constant regardless of RPM change in a range below a critical RPM and power characteristics are constant where torque decreases as the RPM increases in a range equal to or higher than the critical RPM. In the present disclosure, the cone clutch is controlled using the torque characteristics over the RPM of the motor, thereby easily attaining linear changes in torque at an output shaft during gear shifting.

That is, when the gear shifting initiates in the constant torque range, in which the torque is constant over change in RPM of the motor, the RPM of the motor remains in the constant torque range until the gear shifting is finished. Therefore, when the RPM of the motor decreases as the gear shifting is made from the first gear to the second gear, an operating power to operate the cone clutch to produce a frictional force needs to be controlled at a certain tilt, i.e., at a predetermined operating tilt, in order to linearly reduce the torque at the output shaft as shown in FIG. 1.

Furthermore, when the gear shifting is made in the constant power range in which the RPM of the motor falls within, the operating power for the cone clutch is controlled to be constant since the torque at the output shaft changes linearly, by nature of the constant power range itself, without separately changing the operating power for the cone clutch.

Moreover, even when performing the constant control step, because the gear shifting initiates when the RPM of the motor falls within the constant power range, the RPM of the motor may drop and enter into the constant torque range, in which case performing the variable control step again with respect to the condition may linearly change the torque at the output shaft.

During the gear shifting procedure according to the present disclosure, when the torque is transmitted by the cone clutch, the torque is transmitted only by the cone clutch because the first gear is released but the second gear has yet to be interlocked by a synchronizer system.

The variable control step and the constant control step are performed until the synchronizer is interlocked with the second shift gear, and the cone clutch is released to complete the gear shifting after the synchronizer is interlocked with the second shift gear.

The term 'second shift gear' as used herein refers to the second driving gear 2D and second driven gear 2P collectively. Here, the synchronizer is implemented to be interlocked with the second shift gear as a second clutch gear 2C equipped in the second driven gear 2P is interlocked with a sleeve of the synchronizer in the embodiment of FIG. 1.

When the synchronizer is installed on the input axis and the second clutch gear is mounted in the second driving gear, the sleeve of the synchronizer is interlocked with the second clutch gear and integrated with the second driving gear, in which the synchronizer is interlocked with the second shift gear.

The predetermined operating tilt in the variable control step may be obtained by dividing a difference in torque between the current output shaft when the variable control step is initiated and the target output shaft when the variable control step is terminated by a target time required for performing the variable control step.

Figure 2:
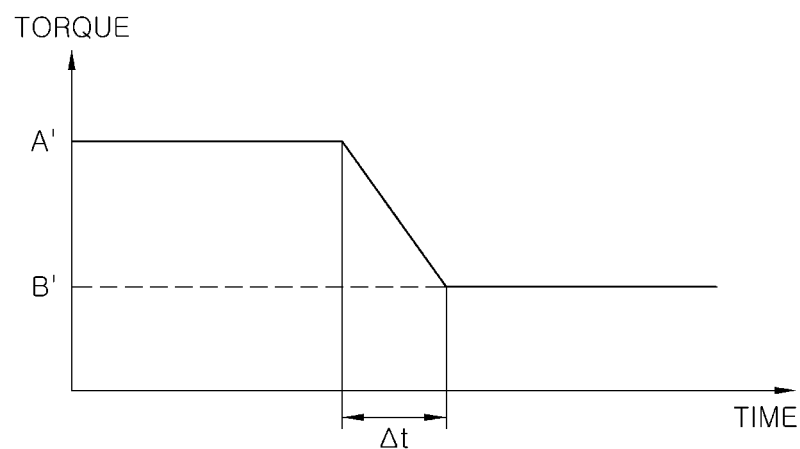
FIG. 2 shows a graph of changes in torque at an output shaft when the 2-speed gearshift of FIG. 1 shifts from a first gear to a second gear.

That is, the operating tilt in the example of FIG. 2 corresponds to $(B'-A')/\Delta t$.

For reference, in the case where the gearshift shown in FIG. 1 shifts between first and second gears, the torque equation may be expressed as follows:

$$B*Tm - I\alpha = Tcl,$$

where B is a 2-speed gear ratio, Tm is motor torque, I is 2-speed gear reflected inertia, $\alpha$ is an angular acceleration, and Tcl is clutch transmissible torque.

When the synchronizer is released and the torque is transmitted only by the cone clutch during gear shifting, the torque at the output shaft may be considered the same as the clutch transmissible torque, which is represented as follows:

$$Tcl = \mu*F*R/\sin\Theta,$$

where $\mu$ is a coefficient of friction of a frictional member of the cone clutch, F is an operating power for the cone clutch, R is an effective rolling radius of the frictional member of the cone clutch, and $\Theta$ is a frictional cone angle on the cone clutch.

When all factors other than F are handled as a constant k in the expression $Tcl = \mu*F*R/\sin\Theta$, $Tcl = \mu*F*R/\sin\Theta = k*F \propto B*Tm$, in which since the motor torque Tm in the constant torque range remains constant before and after gear shifting, the operating power F for the cone clutch needs to be controlled at the operating tilt $(B'-A')/\Delta t$ to change the torque Tcl at the output shaft to be tilted as shown in FIG. 2.

As such, the gear shifting control method according to the present disclosure may facilitate linear changes in torque at the output shaft, and thus improve shift quality by controlling the operating power to suitably operate the cone clutch depending on the operating range of the motor in the situation where 1-2 power-on upshift occurs due to driver's manipulation.

According to the embodiments of the present inventive concept of a gear shifting control method for an electric vehicle with a gearshift having a cone clutch, shift quality may be improved by controlling the cone clutch such that the output torque at an output shaft changes linearly during gear shifting.

Although the embodiments of the present inventive concept have been disclosed for illustrative purposes, those skilled in the art will appreciate that various modifications, additions, and substitutions are possible, without departing from the scope and spirit of the invention as disclosed in the accompanying claims.

What is claimed is:

1. A gear shifting control method for an electric vehicle, the method comprising:
   an operation range determination step of determining, by a controller, whether a current revolution per minute (RPM) of a motor falls within a constant torque range or a constant power range when gear shifting is initiated between a first shift gear and a second shift gear;
a variable control step of controlling, by the controller, an operating power of a cone clutch by adjusting an operating tilt if it is determined that the RPM of the motor falls within the constant torque range in the operation range determination step; and
a constant control step of controlling, by the controller, the operating power of the cone clutch to be constant if it is determined that the RPM of the motor falls within the constant power range in the operation range determination step,
wherein the cone clutch is configured to prevent a torque interruption during shifting by a synchronizer.

2. The gear shifting control method of claim 1,
wherein the controller starts performing the variable control step when the RPM of the motor enters the constant torque range during the constant control step.

3. The gear shifting control method of claim 1,
wherein the variable control step and the constant control step are performed until the synchronizer is interlocked with the second shift gear, and the cone clutch is released after the synchronizer is interlocked with the second shift gear.

4. The gear shifting control method of claim 2,
wherein the operating tilt in the variable control step is obtained by dividing a difference between a current torque of an output shaft when the variable control step is initiated and a target torque of the output shaft when the variable control step is terminated by a target time required for performing the variable control step.

5. The gear shifting control method of claim 1,
wherein the motor is connected to an input shaft for supplying power and an output shaft is parallel to the input shaft,
a first driving gear and a first driven gear are connected to the input shaft and the output shaft,
a second driving gear and a second driven gear are also connected to the input shaft and the output shaft, and
the synchronizer is mounted to the output shaft between the first driven gear and the second driven gear to connect or disconnect the first and second driven gears and to or from the output shaft.

* * * * *